(12) United States Patent
Tan et al.

(10) Patent No.: US 8,256,903 B2
(45) Date of Patent: Sep. 4, 2012

(54) OPTICAL SYSTEM AND PROJECTOR

(75) Inventors: Li Tan, Tainan County (TW); Hoi-Sing Kwok, Tainan County (TW)

(73) Assignee: Himax Display, Inc., Tainan Science-Based Industrial Park, Tainan (TW)

(*) Notice: Subject to any disclaimer, the term of this patent is extended or adjusted under 35 U.S.C. 154(b) by 146 days.

(21) Appl. No.: 12/871,876

(22) Filed: Aug. 30, 2010

(65) Prior Publication Data

US 2011/0211176 A1     Sep. 1, 2011

Related U.S. Application Data

(60) Provisional application No. 61/245,674, filed on Sep. 25, 2009.

(51) Int. Cl.
*G03B 21/28* (2006.01)
(52) U.S. Cl. .......................................... 353/98; 359/776
(58) Field of Classification Search .................. 353/30, 353/31, 34, 37, 38, 70, 77, 78, 98, 99, 101, 353/102; 359/584, 648, 649, 776–778, 850; 348/335, 340, 374, 294, 315, 758; 349/5, 349/7, 8, 9
See application file for complete search history.

(56) References Cited

U.S. PATENT DOCUMENTS

| | | | | |
|---|---|---|---|---|
| 3,649,102 A * | 3/1972 | Conrad | ......................... | 359/777 |
| 3,997,246 A * | 12/1976 | Shoemaker | .................. | 359/716 |
| 5,121,213 A * | 6/1992 | Nishioka | ...................... | 348/335 |
| 6,850,279 B1 * | 2/2005 | Scherling | ...................... | 348/335 |
| 7,581,836 B2 * | 9/2009 | Uchiyama et al. | ............. | 353/30 |
| 2001/0050758 A1 * | 12/2001 | Suzuki et al. | ................... | 353/69 |
| 2006/0050400 A1 * | 3/2006 | Hoffman et al. | ............. | 359/649 |
| 2006/0291046 A1 * | 12/2006 | Nakamura | ..................... | 359/407 |

* cited by examiner

*Primary Examiner* — William C Dowling
*Assistant Examiner* — Sultan Chowdhury
(74) *Attorney, Agent, or Firm* — Winston Hsu; Scott Margo

(57) ABSTRACT

An optical system and a projector utilizing the optical system can prevent tilted projection, hence ensuring that keystone distortion will not occur. The inventive optical system includes a lens group and a reflection layer. The lens group has a plurality of lens elements, and is utilized for guiding an input light beam. A shape of each of lens elements is substantially identical to a shape of a half of a rotationally symmetrical lens. The reflection layer is disposed under the lens group, and utilized for reflecting an incident light beam. As a result, the optical system is configured for guiding the output light beam derived from the input light beam to be projected onto an area substantially higher than a common line.

13 Claims, 4 Drawing Sheets

OPTICAL SYSTEM AND PROJECTOR

CROSS REFERENCE TO RELATED APPLICATIONS

This application claims the benefit of U.S. Provisional Application No. 61/245,674, which was filed on Sep. 25, 2009 and is incorporated herein by reference.

BACKGROUND OF THE INVENTION

1. Field of the Invention

The present invention relates to optical systems, and more particularly, to an optical system and a projector.

2. Description of the Prior Art

A projector takes a video source and projects corresponding images onto a projection screen using a projection lens system. In some cases, the projector placing may deviate from the centerline of the projection screen. Referring to FIG. 1 as an example, the projector 100 is placed on a plane 110 and some of the projection light beam is blocked by the plane 110 due to the improper placement of the projector 100. Therefore, the projector 100 needs to be placed at a tilted angle so that the placement deviates from the centerline of a projection screen 120. This is called "tilted projection", which will result in a distorted trapezoidal shape projected image on the projection screen 120. This kind of distortion is the well-known "keystone distortion."

To ameliorate the keystone distortion, there are two conventional correction methods: digital and optical. Digital keystone correction method involves a scaling/compression algorithm being applied to the image before it is projected on the screen. In effect, the compression algorithm squeezes the entire image down to the thinnest edge of the trapezoidal projected image. While the approach achieves the desired rectangular projected image, it does have some undesirable side-effects, including lowering the resolution and thus degrading the quality of the projected image on the projection screen.

The optical keystone correction method is more commonly applied in LCD projectors. The optical keystone correction method refers to the horizontal or vertical movement of the projection lens with its housing. The optical keystone correction method provides better keystone correction effect without reducing resolution; however, this requires the projection lens to be designed with a larger field, and leads to a projection lens with a larger volume.

Evidently, there are still some problems in the conventional keystone correction methods that need to be overcome.

SUMMARY OF THE INVENTION

With this in mind, the present invention provides a conception for correcting keystone distortion in an optical manner, without the need for any additional components, therefore preventing an increase in the whole volume of the projector or projection lens.

In the present invention, the projection lens may be constructed by cutting the conventional rotationally symmetrical projection lens in half horizontally and a mirror may be put under the bottom of the projection lens to form the inventive optical system. The inventive optical system can maintain its output projection light beam projected on to an area above a specific level by offset projection.

The present invention also provides a projector using the inventive optical system comprised of a plurality half-lenses, which is slimmer and has more flexibility compared to the conventional projector since the lenses in the inventive optical system are only half the size of conventional lenses.

According to one exemplary embodiment, an optical system of the present invention comprises a reflection layer and a lens group. The lens group has a plurality of lens elements and is disposed on the reflection layer. Each of the lens elements has a section, a light incident surface facing towards an object side, and a light emitting surface facing towards an image side, wherein the section is between the light incident surface and the light emitting surface. In addition, a shape of each of lens elements is substantially identical to a shape of a half of a rotationally symmetrical lens, and the section of each of lens elements is in contact with the reflection layer.

According to one exemplary embodiment, a projector of the present invention comprises a projecting module and an optical system. The projecting module is utilized for generating an output light beam corresponding to an image to be projected. The optical system is configured for guiding the output light beam to be imaged onto an area substantially higher than a common line and comprises a reflection layer and a lens group. The reflection layer is disposed along the common line. The lens group has a plurality of lens elements and is disposed on the reflection layer. Each of the lens elements has a section, a light incident surface facing towards an object side, a light emitting surface facing towards an image side. Wherein, the section is between the light incident surface and the light emitting surface. In addition, a shape of each of lens elements is substantially identical to a shape of a half of a rotationally symmetrical lens, and the section of each of lens elements is in contact with the reflection layer.

As a result, in most cases, the inventive projector can prevent tilted projection since the projection light beam outputted by the inventive projector will not be blocked and therefore the projector does not need to be placed in a position that deviates from the centerline of the projection screen.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
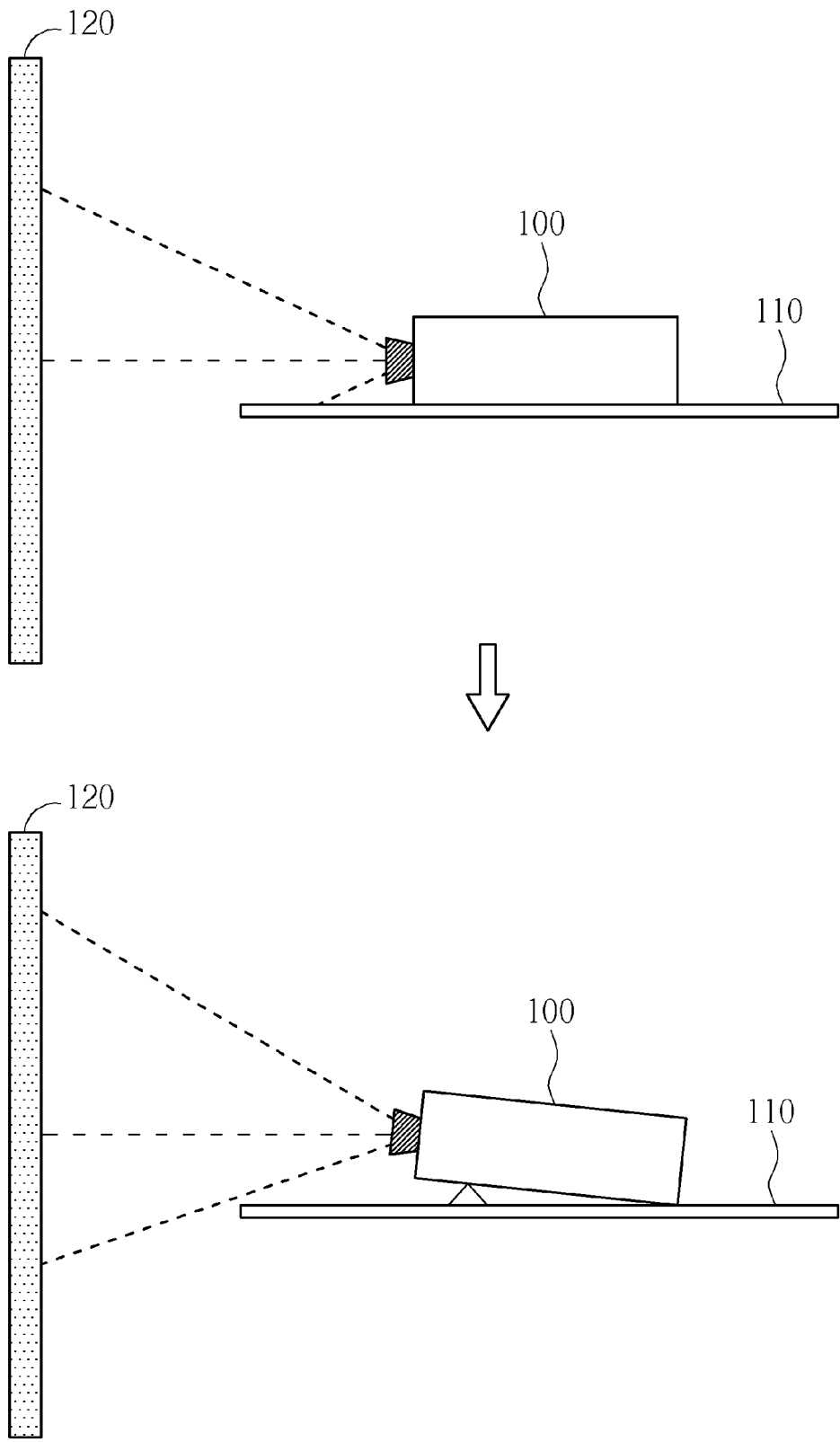
FIG. 1 is a conceptual diagram showing the tilted projection occurring in a conventional projector.
Figure 2:
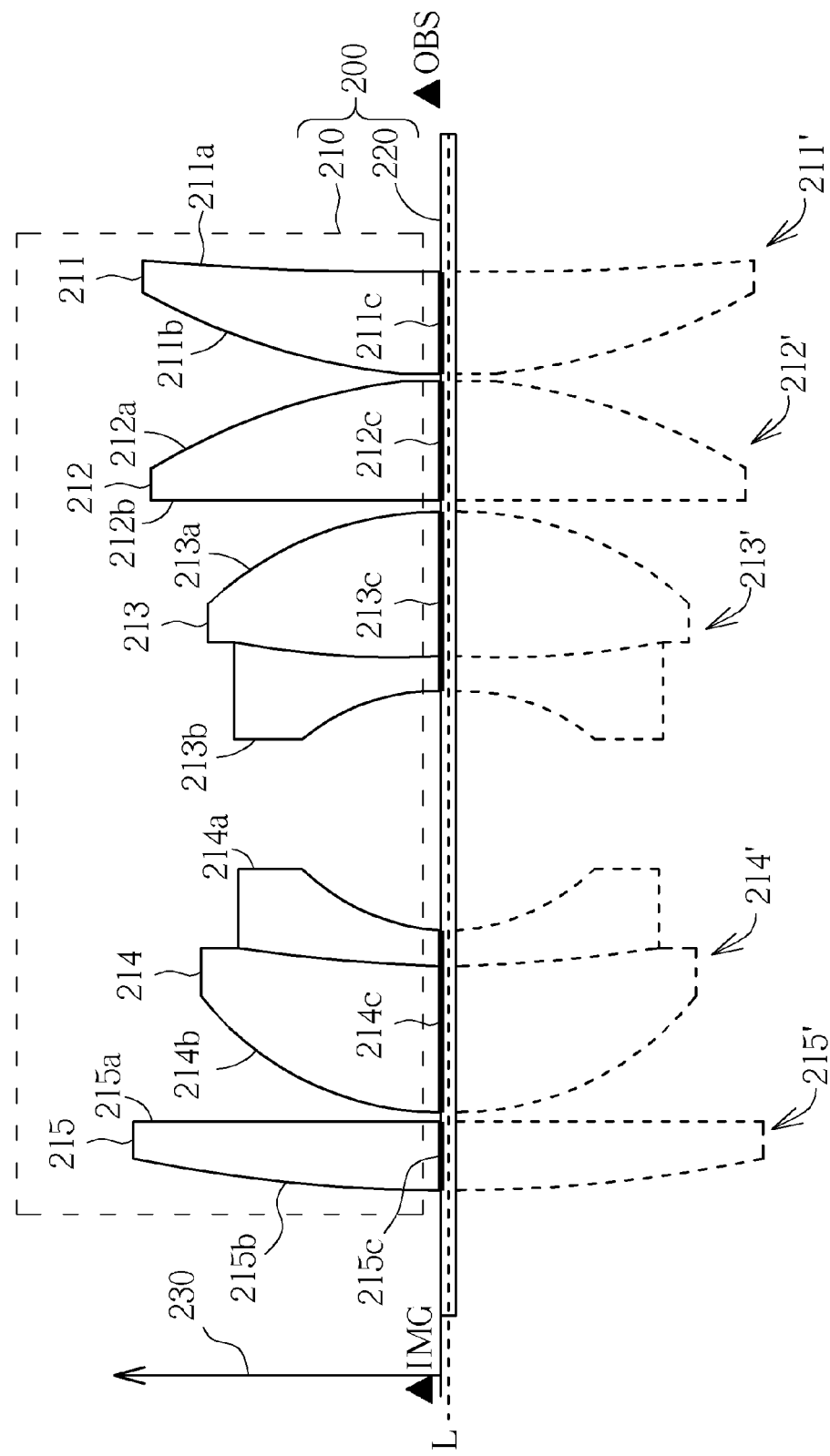
FIG. 2 is a diagram showing an inventive optical system according to one exemplary embodiment of the present invention.

Please refer to FIG. 2, which illustrates an exemplary embodiment of the inventive optical system. As shown in FIG. 2, an inventive optical system 200 comprises a lens group 210 and a reflection layer 220. The lens group 210 has a plurality of lens elements 211-215, and is utilized for guiding an input light beam. In addition, the lens group 210 is disposed on the reflection layer 220. Preferably, each of the lens elements 211-215 has a shape substantially identical to a shape of half of a rotationally symmetrical lens (e.g. lens 211'-215'); that is, each lens elements 211-215 is not rotationally symmetrical. Each of the lens elements 211-215 has a section (i.e., 211c-215c), a light incident surface (i.e., 211a-215a) facing towards an object side OBS, a light emitting surface facing (i.e., 211b-215b) towards an image side IMG, wherein the section is between the light incident surface and the light emitting surface. In addition, the section of each of lens elements is in contact with the reflection layer.

The lens elements 211-215 may be constructed by cutting the conventional rotationally symmetrical projection lens in half horizontally; however, other fabrication processes are possible. Preferably, the lens elements 211-215 comprise, in order from the object side OBS to the image side IMG: a first lens element 211, a second lens element 212, a third lens element 213, a fourth lens element 214 and a fifth lens element 215. The first lens element 211 has a shape substantially identical to a shape of half of a plano-convex lens 211', wherein a light incident surface 211a of the first lens element 211 is a planar surface and a light emitting surface 211b of the first lens element 211 is a convex surface. The second lens element 212 has a shape substantially identical to a shape of half of a plano-convex lens 212', wherein a light incident surface 212a of the second lens element 212 is a convex surface and a light emitting surface 212b of the second lens element is 212 a planar surface. The third lens element 213 has a shape substantially identical to a shape of half of a convex-concave lens 213', wherein a light incident surface 213a of the third lens element 213 is a convex surface and a light emitting surface 213b of the third lens element 213 is a concave surface. The fourth lens element 214 has a shape substantially identical to a shape of half of a convex-concave lens 214', wherein a light incident surface 214a of the fourth lens element 214 is a concave surface and a light emitting surface 214b of the fourth lens element 214 is a convex surface. The fifth lens element 215 has a shape substantially identical to a shape of half of a plano-convex lens 215', wherein a light incident surface 215a of the fifth lens element 215 is a planar surface and a light emitting surface 215b of the fifth lens element 215 is a convex surface. Please note that the above-mentioned types and numbers of lens elements in the inventive lens group are just meant for illustrative purposes rather than as limitations to the design.

The reflection layer 220 is disposed under the lens group 210, and utilized for reflecting an incident light beam (which may be derived from the input light beam). In a preferred case, each of the lens group 210 may directly contact with the reflection layer 220, and be cemented to the reflection layer 220. In addition, the reflection layer 220 may be planar, and sections 211c-215c of each of the lens elements 211-215 is coated with a reflective material. Alternatively, the reflection layer 220 and the sections 211c-215c of the lens elements 211-215 can reflect the incident light beam whose transmission path is toward the reflection layer 220.

Subsequently, the inventive optical system 200 is capable of guiding an output light beam derived from the input light beam to be projected onto an area (e.g. area 230) substantially higher than a common line L which the reflection layer 220 is disposed along. Thus, if a projector utilizes the inventive optical system 200, the projector can avoid the tilted projection. This is because, no mater what position the projector is placed at, it is unnecessary to put the projector in a position that deviates from the centerline of the projection screen. Accordingly, the present invention also provides an inventive projector utilizing the inventive optical system.

Figure 3:
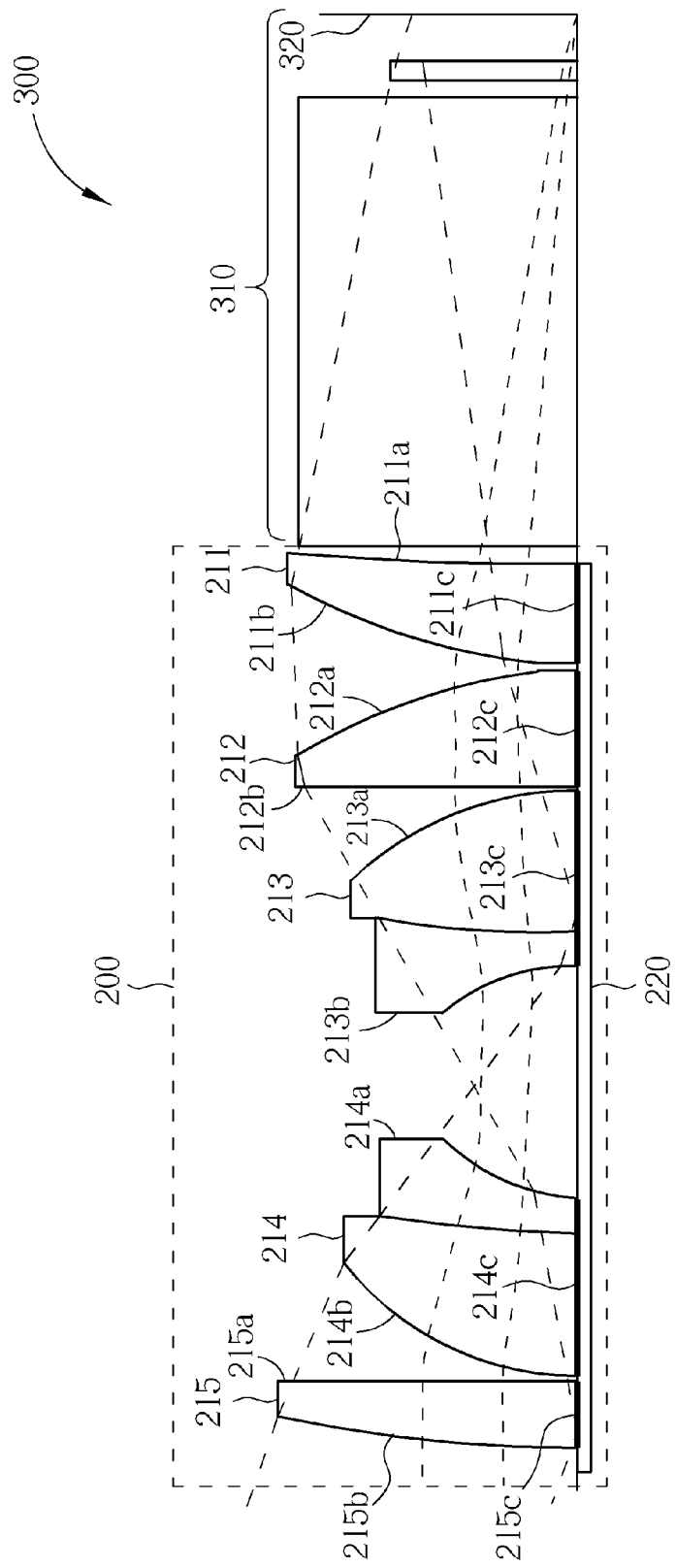
FIG. 3 is a diagram showing an inventive projector according to one exemplary embodiment of the present invention.

Please refer to FIG. 3, which illustrates an exemplary embodiment of the inventive projector. As shown in FIG. 3, the inventive projector 300 comprises: a projecting module 310 and the optical system 200. The projecting module 310 is utilized for generating an output light beam corresponding to an image source to be projected. Elements of the optical system 200 in FIG. 2 and in FIG. 3 designated by the same numbers have the same structure and functions, so the detailed description is not repeated again. In the inventive projector 300, the lens group 210 of the inventive optical system is utilized for guiding the output light beam corresponding to the image source to be imaged onto an area substantially higher than the common line L. The reflection layer 220 is utilized for reflecting an incident light beam (which may be derived from the output light beam).

Figure 4:
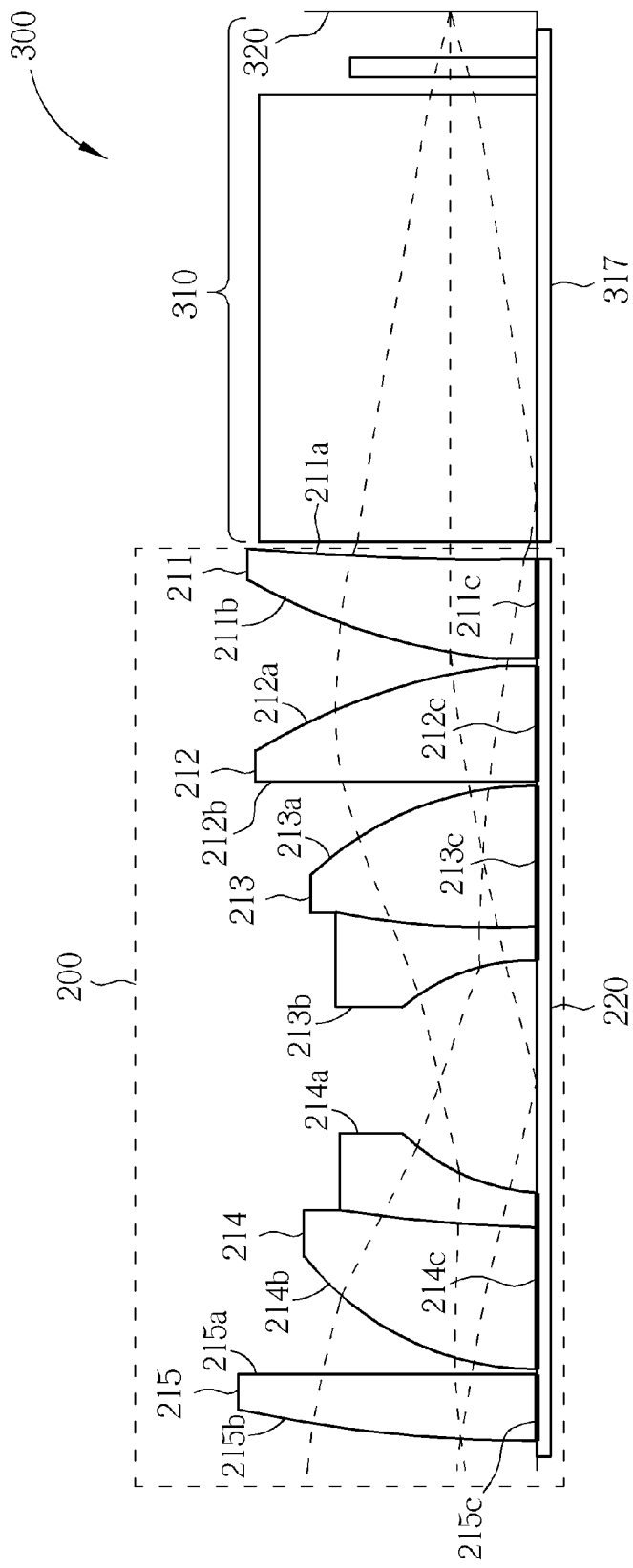
FIG. 4 is a diagram showing an inventive projector according to another exemplary embodiment of the present invention.

The projecting module 310 may comprise (but is not limited to) a light source (not shown), a display panel 320, a condensing lens (not shown), and a polarizer (not shown). The display panel 320 is utilized for displaying the image source to be projected according to a video signal supplied to the projector 300, and a bottom of the display panel 320 is disposed higher than the common line L and the reflection layer 220. A distance between the bottom of the display panel 320 and the reflection layer 220 is adjustable. In a preferred case, the display panel 320 is implemented with a Liquid crystal on silicon (LCOS) panel; however, this is not a limitation of the present invention. The display panel 320 firstly displays the image source according to the video signal, and then the light irradiated by light source 310 will pass through the condensing lens and be supplied to the polarizer. Then, the polarizer supplies the polarized light beam to the display panel 320. Accordingly, the display panel 320 generates the output light beam corresponding to the image source. Subsequently, the output light beam will pass through the inventive optical system 200. Through the inventive optical system 200, a projection light beam is derived from the output light beam and will be projected onto the projection screen. The optical system 200 is configured for guiding the output light beam to be projected onto an area substantially higher than a common line L. In a preferred case, the projecting module 310 further comprises a reflection layer 317. Please refer to FIG. 4. As can be seen from the diagram, the reflection layer 317 is disposed on the bottom of the projecting module 310 and along the common line L. This can reflect the output light beam from the display panel 320 so as to ensure the output light beam must pass through the optical system 200.

In conclusion, the inventive optical system is configured for guiding the output light beam derived from the input light beam of the inventive projector to be projected onto an area substantially higher than a common line or the reflection layer. Thus, the tilted projection can be avoided. Another advantage of the present invention is that the volume of the projector can be reduced since the size of the inventive optical system is only half of the size of the conventional projection lens Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An optical system, comprising:
a reflection layer; and
a lens group, having a plurality of lens elements, disposed on the reflection layer, each of the lens elements has a section, a light incident surface facing towards an object side, a light emitting surface facing towards an image side, wherein the section is between the light incident surface and the light emitting surface;
wherein a shape of each of lens elements is substantially identical to a shape of a half of a rotationally symmetri- cal lens, and the section of each of lens elements is in contact with the reflection layer.

2. The optical system of claim 1, wherein the reflection layer is planar, and the section of each of the lens elements is also planar.

3. The optical system of claim 1, wherein the section of each of the lens elements is coated with a reflective material.

4. The optical system of claim 1, wherein each of the lens elements is not rotationally symmetrical.

5. The optical system of claim 4, wherein the lens elements comprise, in order from the object side:
   a first lens element, having a shape substantially identical to a shape of a half of a plano-convex lens, wherein the light incident surface of the first lens element is a planar surface and the light emitting surface of the first lens element is a convex surface;
   a second lens element, having a shape substantially identical to a shape of a half of a plano-convex lens, wherein the light incident surface of the second lens element is a convex surface and the light emitting surface of the second lens element is a planar surface;
   a third lens element, having a shape substantially identical to a shape of a half of a convex-concave lens, wherein the light incident surface of the third lens element is a convex surface and the light emitting surface of the third lens element is a concave surface;
   a fourth lens element, having a shape substantially identical to a shape of a half of a convex-concave lens, wherein the light incident surface of the fourth lens element is a concave surface and the light emitting surface of the fourth lens element is a convex surface; and
   a fifth lens element, having a shape substantially identical to a shape of a half of a plano-convex lens, wherein the light incident surface of the fifth lens element is a planar surface and the light emitting surface of the fifth lens element is a convex surface.

6. A projector, comprising:
   a projecting module, for generating an output light beam corresponding to an image to be projected; and
   an optical system, for guiding the output light beam to be imaged onto an area substantially higher than a common line, comprising:
      a reflection layer, disposed along the common line; and
      a lens group, having a plurality of lens elements, disposed on the reflection layer, each of the lens elements has a section, a light incident surface facing towards an object side, a light emitting surface facing towards an image side, wherein the section is between the light incident surface and the light emitting surface;
   wherein a shape of each of lens elements is substantially identical to a shape of a half of a rotationally symmetrical lens, and the section of each of lens elements is in contact with the reflection layer.

7. The projector of claim 6, wherein the projecting module comprises a display panel, and a bottom of the display panel is disposed higher than the common line.

8. The projector of claim 7, wherein the display panel is a Liquid crystal on silicon (LCOS) panel.

9. The projector of claim 6, wherein the projecting module further comprises a reflection layer along the common line.

10. The projector of claim 6, wherein the reflection layer of the optical system is planar, and the section of each of the lens elements is also planar.

11. The projector of claim 6, wherein the section of each of the lens elements is coated with a reflective material.

12. The projector of claim 6, wherein each of the lens elements is not rotationally symmetrical.

13. The projector of claim 12, wherein the lens elements comprises, in order from the object side:
   a first lens element, having a shape substantially identical to a shape of a half of a plano-convex lens, wherein the light incident surface of the first lens element is a planar surface and the light emitting surface of the first lens element is a convex surface;
   a second lens element, having a shape substantially identical to a shape of a half of a plano-convex lens, wherein the light incident surface of the second lens element is a convex surface and the light emitting surface of the second lens element is a planar surface;
   a third lens element, having a shape substantially identical to a shape of a half of a convex-concave lens, wherein the light incident surface of the third lens element is a convex surface and the light emitting surface of the third lens element is a concave surface;
   a fourth lens element, having a shape substantially identical to a shape of a half of a convex-concave lens, wherein the light incident surface of the fourth lens element is a concave surface and the light emitting surface of the fourth lens element is a convex surface; and
   a fifth lens element, having a shape substantially identical to a shape of a half of a plano-convex lens, wherein the light incident surface of the fifth lens element is a planar surface and the light emitting surface of the fifth lens element is a convex surface.

\* \* \* \* \*